United States Patent
Sacripante et al.

(10) Patent No.: US 9,309,355 B1
(45) Date of Patent: Apr. 12, 2016

(54) CATALYST FOR POLYESTER POLYCONDENSATION REACTION

(71) Applicant: Xerox Corporation, Norwalk, CT (US)

(72) Inventors: Guerino G Sacripante, Oakville (CA); David R Kurceba, Hamilton (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/626,932

(22) Filed: Feb. 20, 2015

(51) Int. Cl.
*C08G 63/02* (2006.01)
*C08G 63/672* (2006.01)
*G03G 9/087* (2006.01)

(52) U.S. Cl.
CPC .......... *C08G 63/672* (2013.01); *G03G 9/08755* (2013.01)

(58) Field of Classification Search
CPC ......... C08G 63/85; C08G 63/82; C08G 63/78
USPC ............ 528/271, 272, 279; 430/108.4, 109.4, 430/110.4
See application file for complete search history.

(56) References Cited

U.S. PATENT DOCUMENTS

| | | | | |
|---|---|---|---|---|
| 3,632,402 A * | 1/1972 | Weissermel | ......... | C08K 5/1515 428/404 |
| 8,030,435 B2 * | 10/2011 | Odorisio | ................ | C08G 63/80 502/150 |
| 2005/0164112 A1* | 7/2005 | Ohki | .................... | G03G 9/0804 430/108.22 |
| 2006/0046174 A1* | 3/2006 | Ohki | .................... | G03G 9/0804 430/108.4 |
| 2007/0015077 A1* | 1/2007 | Yamashita | ........... | G03G 9/0804 430/109.4 |
| 2011/0305913 A1* | 12/2011 | Hinton | .................. | B29C 55/065 428/480 |
| 2014/0051021 A1* | 2/2014 | Sakamoto | .............. | G03G 9/093 430/109.4 |

* cited by examiner

*Primary Examiner* — Terressa Boykin
(74) *Attorney, Agent, or Firm* — Eugene O. Palazzo

(57) ABSTRACT

The present disclosure provides a colorless polyester resin produced using phosphinic acid, optionally in combination with a titanium-based catalyst.

20 Claims, No Drawings

CATALYST FOR POLYESTER POLYCONDENSATION REACTION

FIELD

Optically clear polyester resins; and methods of producing such optically clear polyester resins using phosphinic acid, optionally in combination with a titanium-based catalyst are described.

BACKGROUND

With an increased focus on environmental impact and on health, there is an interest and/or a need to find replacements for existing reagents to reduce environmental and health risks associated with toner production and use. Some current polyester-based toners are composed of fossil fuel-based materials, including bisphenol A (BPA). BPA has been linked to a variety of health concerns. Several Europe countries, Canada and several U.S. states are targeting a ban of BPA.

Renewable or biodegradable reagents and materials, such as, those which are plant-based/animal-based or which are biodegradable, are being investigated as replacements for current toner reagents.

Polyester resins using renewable materials may be produced with inferior color, especially when long process time is involved. When Gardner Index color is poor, the resin may be discarded.

It is desirable, then, to employ a process which produces polyester resins from, for example, sustainable materials, having superior color properties.

SUMMARY

The instant disclosure provides a process for producing colorless polyester resin, which may comprise biodegradable reagents, comprising use of a phosphinic acid, alone or in combination. The resin does not require a decoloration treatment.

In embodiments, a colorless polyester resin (cPR) is disclosed, which cPR results from reacting one or more polyacids, one or more polyols and a phosphinic acid, alone or in combination with a titanium catalyst.

In embodiments, a cPR is comprised of a rosin diol, optionally, a second polyol, and a polyacid, made with a phosphinic acid, alone or in combination with a titanium catalyst.

In embodiments, a rosin acid is reacted with a bis-epoxy monomer to form a rosin diol, the rosin diol and optionally, a polyol are reacted with a polyacid in the presence of a phosphinic acid, alone or in combination with a titanium catalyst.

In embodiments, the bis-epoxy monomer includes 1,3-butadiene diepoxide, 1,4-butanediol diglycidyl ether, 1,4-cyclohexanedimethanol diglycidyl ether, 1,2,7,8-diepoxyoctane and neopentyl glycol diglycidyl ether.

DETAILED DESCRIPTION

Introduction

A process for making low cost, polyester resins, such as, those which are bio-based, may be obtained by making a rosin diol using a bis-epoxy monomer and a rosin acid according to the following scheme:

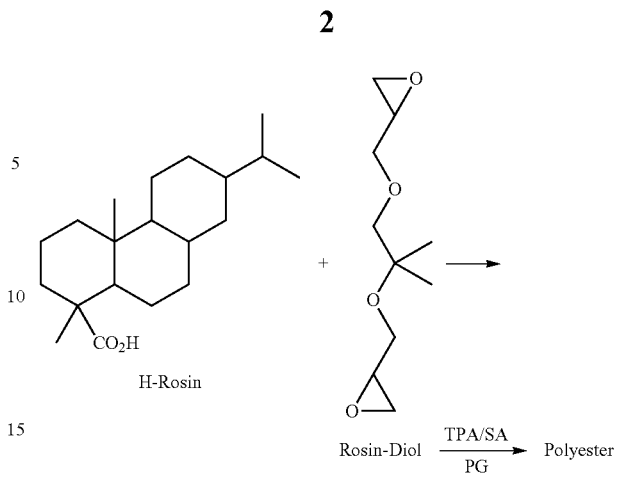

The, "H-rosin," refers to a rosin acid, and the rosin diol then may be reacted, for example, with terephthalic acid (TPA), succinic acid (SA) and 1,2-propylene glycol (PG) in the presence of a phosphinic acid, alone or in combination with a titanium catalyst via a polycondensation reaction to form a colorless polyester resin. Other polyols that can be use include ethylene glycol, butylene glycol and pentylene glycol.

A catalyst used in a polyester polycondensation reaction, e.g., the titanium-based, TC-400 (Matsumoto Fine Chemicals, JP), results in a polyester resin that exhibits a yellow color, which resin is acceptable only when the polycondensation reaction is optimized to under 20 hours, which limits the species of polyester polymers that can be produced.

In the present disclosure, it was observed that using phosphinic acid as catalyst of the polycondensation reaction produces a superior resin color, that is, colorless. While not being bound by theory, the phosphinic acid, known to decompose to phosphorous acid and phosphine, which forms phosphinites, is believed to act as an anti-oxidizer (reducing agent). Only small amounts of phosphinic acid (for example, no more than about 0.01 wt %) are needed to produce a polyester resin that is essentially colorless.

In embodiments, combining phosphinic acid with other catalysts, such as, a titanium-based catalyst, results in colorless resin, but with a reduced reaction time.

The present disclosure provides a polyester resin that may be used to produce toner particles, toners, developers comprising said toner and so on.

Unless otherwise indicated, all numbers expressing quantities and conditions, and so forth used in the specification and claims are to be understood as being modified in all instances by the term, "about." "About," is meant to indicate a variation of no more than 10% from the stated value. Also used herein is the term, "equivalent," "similar," "essentially," "substantially," "approximating" and "matching," or grammatical variations thereof, have generally acceptable definitions or at the least, are understood to have the same meaning as, "about."

In the application, resins and polyester polymers are named using the component reagents, even though the chemical entity comprising the polyester no longer is identical to the starting reagent, for example, because, of loss of a hydrogen ion and a hydroxyl group to form the ester bond between an adjacent acid and alcohol. Hence, for example, a polyester polymer made using trimellitic acid and propanediol as reagents can be called a trimellitic polyester, a propanediol polyester or a trimellitic-propanediol polyester.

As used herein, "biobased," or use of the prefix, "bio," refers to a reagent or to a product that is composed, in whole or in part, of a biological product, including plant, animal and marine materials, or derivatives thereof. Generally, a biobased or biomaterial is biodegradable, that is, substantially or completely biodegradable, by substantially is meant greater than 50%, greater than 60%, greater than 70% or more of the material is degraded from the original molecule to another form by a biological or environmental mechanism, such as, action thereon by bacteria, animals, plants, light, temperature, oxygen and so on in a matter of days, matter of weeks, a year or more, but generally no longer than two years. A, "bioresin," is a resin, such as, a polyester, which contains or is composed of a biobased material in whole or in part, such as, a polyglycol, such as, polyethylene glycol and a dicarboxylic acid. Hence, the reagents can be a biopolyacid and a biopolyol. Such a resin can be described as, "sustainable," that is to say, does not carry or has a minimal negative impact on the environment.

As used herein, "clear," means optically transparent, which may be determined by demonstrating that a material has a transmission of visible light greater than about 70%, greater than about 80%, greater than about 90%, or more, as shown, for example, with a colorimeter or using an Ocean Optics SD2000 UV-Vis spectrometer. Clear is the substantial absence of color. A product of interest, make by a process of interest using phosphinic acid as catalyst, alone or in combination, is colorless on formation in the polycondensation reaction without having to be decolored in any way, for example, exposed to activated charcoal or a chelator, or by washing.

A suitable method for determining the degree of colorlessness of a transparent liquid is that provided in Designation: D 1544-04 and D6166 of ASTM International entitled, "Standard Test Method for Color of Transparent Liquids (Gardner Color Scale)," which is a method for determining the degree of yellowness of a transparent liquid, such as, resin solutions. The standards are available commercially, for example, from Gardco, FL, as a series of 18 fluids or as glass filters, and the color comparisons can be made using, for example, a Tintometer PFX190 colorimeter (Lovibond, FL.) The #1 standard is lacking in color and the samples are progressively more yellow and red culminating with standard #18 which is a brownish red.

As used herein, "colorless," means lacking perceptible or visually measurable color or hue, that is, the substantial absence of all color. That can be determined by a spectrophotographic means and method, such as, determining the Gardner Color Scale value of a sample. For the purposes herein, a colorless resin sample is one with a Gardner Color Scale value no greater than 5, no greater than 4, no greater than 3, no greater than 2 as resin with color may have a negative impact on toner color or reproducibly obtaining a certain toner color.

Resins and Polymers

Polyesters as disclosed herein may be obtained by the polycondensation of polyols and polyacids in the presence of phosphinic acid, alone or in combination with a titanium-based catalyst. The polyesters disclosed herein can be biobased, that is, some or all of the reagents used to prepare the polyester can be biodegradable. For example, a rosin diol can be used as a polyol.

In embodiments, a rosin diol may be produced by reacting a rosin acid with a bis-epoxy monomer. Rosin acids are diterpenes, are known and are commercially available. For example, abietic acid (also known as abietinic acid or sylvic acid) occurs in trees and is the primary component of rosin, the solid portion of oleoresin of coniferous trees, Lockwood, L. B., "Production of Organic Acids by Fermentation," in Microbial Technology, Peppier, H. J. and Perlman, D. eds., Academic Press: NY, pp. 356-387 (1979), the entire disclosure of which is incorporated by reference herein.

Other rosin acids include neoabietic acid, dehydroabietic acid, palustric acid, levopimaric acid, pimaric acid and isopimaric acid.

Useful bis-epoxy monomers include, but are not limited to, 1,3-butadiene diepoxide, 1,4-butanediol diglycidyl ether, 1,4-cyclohexanedimethanol diglycidyl ether, 1,2,7,8-diepoxyoctane and neopentyl glycol diglycidyl ether.

The rosin acid(s) and bis-epoxy monomer are combined and exposed to elevated temperatures, such as, from about 150° C. to about 250° C., and the reaction maintained until the acid is consumed to a desired level.

Suitable rosin diols include abietic-diol, abietic-monoglycerate, palustric-diol, palustric-monoglycerate, dehydroabietic-diol, dehydroabietic-monoglycerate, neoabietic-diol, neo-abietic-monoglycerate, levo-pimaric-diol, levo-pimaric-monoglycerate, pimaric-diol, pimaric-monoglycerate, sandaracopimaric-diol, sandaracopimaric-monoglycerate, iso-pimaric-diol, iso-pimaric-monoglycerate, hydrogenated abietic-diol, hydrogenated palustric-diol, hydrogenated dehydroabietic-diol, hydrogenated neo-abietic-diol, hydrogenated levo-pimaric-diol, hydrogenated pimaric-diol, hydrogenated sandaracopimaric-diol and hydrogenated iso-pimaric-diol.

Examples of polyacids or polyesters that may be used for preparing an amorphous polyester resin include terephthalic acid, phthalic acid, isophthalic acid, fumaric acid, trimellitic acid, diethyl fumarate, dimethyl itaconate, cis-1,4-diacetoxy-2-butene, dimethyl fumarate, diethyl maleate, maleic acid, succinic acid, itaconic acid, succinic acid, cyclohexanoic acid, succinic anhydride, dodecylsuccinic acid, dodecylsuccinic anhydride, glutaric acid, glutaric anhydride, adipic acid, pimelic acid, suberic acid, azelaic acid, dodecanedioic acid, dimethyl naphthalenedicarboxylate, dimethyl terephthalate, diethyl terephthalate, dimethylisophthalate, diethylisophthalate, dimethylphthalate, phthalic anhydride, diethylphthalate, dimethylsuccinate, naphthalene dicarboxylic acid, dimer diacid, dimethyl fumarate, dimethylmaleate, dimethylglutarate, dimethyladipate, dimethyl dodecylsuccinate and combinations thereof. The polyacid or polyester reagent may be present, for example, in an amount from about 40 to about 60 mole % of the resin, from about 42 to about 52 mole % of the resin.

Examples of polyols which may be used in generating an amorphous polyester resin include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis (2-hydroxyethyl) oxide, dipropylene glycol, dibutylene glycol and combinations thereof. The amount of polyol may vary, and may be present, for example, in an amount from about 40 to about 60 mole % of the resin, from about 42 to about 55 mole % of the resin.

For forming a crystalline polyester resin, suitable polyols include aliphatic polyols with from about 2 to about 36 carbon atoms, such as, 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol and the like. The polyol may be, for example, selected in an amount from about 40 to about 60 mole %, from about 42 to about 55 mole % of the resin.

Examples of polyacid or polyester reagents for preparing a crystalline resin include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid (sometimes referred to herein, in embodiments, as cyclohexanedioic acid), malonic acid and mesaconic acid, a polyester or anhydride thereof. The polyacid may be selected in an amount of, for example, from about 40 to about 60 mole %, from about 42 to about 52 mole %.

In embodiments, an optional branching agent may used, and include, but are not limited to, 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl) methane, 1,2,7,8-octanetetracarboxylic acid, acid anhydrides thereof and lower alkyl esters thereof.

Polycondensation titanium-based catalysts include catalysts exemplified by, but not limited to, Orgatics TA-25 (tetra-n-butyl titanate), TA-30 (tetra(2-ethylhexyl)titanate), TA-70 (tetramethyl titanate) or the like for titanium alkoxides; Orgatics TPHS (polyhydroxytitanium stearate) or the like for titanium acylate; and Orgatics TC-401 (titanium tetraacetyl acetate), TC-200 (titanium octylene glycolate), TC-750 (titanium ethyl acetoacetate), TC-310 (titanium lactate), TC-400 (titanium triethanol aminate) or the like for titanium chelate (all are products of Matsumoto Pharmaceutics Industry, Co., Ltd.) Such catalysts are used in combination with phosphinic acid.

In embodiments, a ratio of the parts by weight of the titanium-based catalyst to phosphinic acid resin can be from about 2:1 to about 5:1, from about 2.5:1 to about 4.5:1, from about 3:1 to about 4:1.

The phosphinic acid is used in an amount, by weight, of no more than about 0.04 wt % of the total reactants, no more than about 0.03 wt %, no more than about 0.02 wt %, no more than about 0.01 wt %, no more than about 0.008 wt %, no more than about 0.005 wt %, whether used alone or in combination with another catalyst.

In embodiments, polycondensation temperatures range from about 150° to 250° C., from about 185° C. to about 215° C. The total reaction time may range from about 15 to about 35 hours, but may be outside of that range.

Other polyester resins may be used in combination with a bio-based resin to form a toner and include those which are sulfonated, crystalline, amorphous, combinations thereof and the like. Polyester resins may include those described, for example, in U.S. Pat. Nos. 6,593,049; 6,830,860; 7,754,406; 7,781,138; 7,749,672; and 6,756,176, the disclosure of each of which herein is incorporated by reference in entirety.

When a mixture is used, such as, amorphous and crystalline polyester resins, the ratio of crystalline polyester resin to amorphous polyester resin may be in the range from about 1:99 to about 30:70.

An unsaturated amorphous polyester resin may be used. Examples include those disclosed in U.S. Pat. No. 6,063,827, the disclosure of which herein is incorporated by reference in entirety. Exemplary unsaturated amorphous polyester resins include, but are not limited to, poly(1,2-propylene fumarate), poly(1,2-propylene maleate), poly(1,2-propylene itaconate) and combinations thereof.

Specific crystalline resins include poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(ethylene-adipate) and so on. Examples of polyamides include poly(ethylene-adipamide), poly(propylene-adipamide), poly(butylene-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), and poly(butylene-succinimide).

Suitable crystalline resins which may be utilized, optionally, in combination with an amorphous resin as described above, include those disclosed in U.S. Pub. No. 2006/0222991, the disclosure of which herein is incorporated by reference in entirety.

A suitable crystalline resin may include a resin formed of ethylene glycol and a mixture of dodecanedioic acid and fumaric acid co-monomers with the following formula:

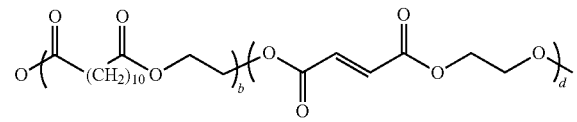

wherein b is from about 5 to about 2000 and d is from about 5 to about 2000.

The crystalline resin may be present, for example, in an amount from about 1 to about 85% by weight of the toner components, from about 2 to about 50% by weight of the toner components, from about 5 to about 15% by weight of the toner components. The crystalline resin may possess various melting points of, for example, from about 30° C. to about 120° C., from about 50° C. to about 90° C., from about 60° C. to about 80° C. The crystalline resin may have a number average molecular weight ($M_n$), as measured by gel permeation chromatography (GPC) of, for example, from about 1,000 to about 50,000, from about 2,000 to about 25,000, and a weight average molecular weight ($M_w$) of from about 2,000 to about 100,000, from about 3,000 to about 80,000, as determined by GPC. The molecular weight distribution ($M_w/M_n$) of the crystalline resin may be from about 2 to about 6.

Colorants

Suitable colorants include those comprising carbon black, such as, REGAL 330® and Nipex 35; magnetites, such as, Mobay magnetites, MO8029™ and MO8060™; Columbian magnetites, MAPICO® BLACK; surface-treated magnetites;

Pfizer magnetites, CB4799™, CB5300™, CB5600™ and MCX6369™; Bayer magnetites, BAYFERROX 8600™ and 8610™; Northern Pigments magnetites, NP-604™ and NP-608™; Magnox magnetites, TMB-100™ or TMB-104 ™; and the like.

Colored pigments, such as, cyan, magenta, yellow, red, orange, green, brown, blue or mixtures thereof may be used. The additional pigment or pigments may be used as water-based pigment dispersions.

Examples of pigments include SUNSPERSE 6000, FLEXIVERSE and AQLTATONE, water-based pigment dispersions from SUN Chemicals; HELIOGEN BLUE L6900™, D6840™, D7080™, D7020™, PYLAM OIL BLUE™, PYLAM OIL YELLOW™ and PIGMENT BLUE 1™ available from Paul Uhlich & Company, Inc.; PIGMENT VIOLET I™, PIGMENT RED 48™, LEMON CHROME YELLOW DCC 1026™, TOLUIDINE RED™ and BON RED C™ available from Dominion Color Corporation, Ltd., Toronto, Ontario; NOVAPERM YELLOW FGL™ and HOSTAPERM PINK E™ from Hoechst; CINQUASIA MAGENTA™ available from E.I. DuPont de Nemours & Co., and the like.

Examples of magenta pigments include 2,9-dimethyl-substituted quinacridone, an anthraquinone dye identified in the Color Index as CI 60710, CI Dispersed Red 15, a diazo dye identified in the Color Index as CI 26050, CI Solvent Red 19 and the like.

Illustrative examples of cyan pigments include copper tetra (octadecylsulfonamido) phthalocyanine, a copper phthalocyanine pigment listed in the Color Index as CI 74160, CI Pigment Blue, Pigment Blue 15:3, Pigment Blue 15:4, an Anthrazine Blue identified in the Color Index as CI 69810, Special Blue X-2137 and the like.

Illustrative examples of yellow pigments are diarylide yellow 3,3-dichlorobenzidene acetoacetanilide, a monoazo pigment identified in the Color Index as CI 12700, CI Solvent Yellow 16, a nitrophenyl amine sulfonamide identified in the Color Index as Foron Yellow SE/GLN, CI Disperse Yellow 3, 2,5-dimethoxy-4-sulfonanilide phenylazo-4'-chloro-2,5-dimethoxy acetoacetanilide and Permanent Yellow FGL.

Other known colorants may be used, such as, Levanyl Black A-SF (Miles, Bayer) and Sunsperse Carbon Black LHD 9303 (Sun Chemicals), and colored dyes, such as, Neopen Blue (BASF), Sudan Blue OS (BASF), PV Fast Blue B2G 01 (American Hoechst). Sunsperse Blue BHD 6000 (Sun Chemicals), Irgalite Blue BCA (CibaGeigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), SUCD-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing and the like. Other pigments that may be used, and which are commercially available include various pigments in the color classes, Pigment Yellow 74, Pigment Yellow 14, Pigment Yellow 83, Pigment Orange 34, Pigment Red 238, Pigment Red 122, Pigment Red 48:1, Pigment Red 269, Pigment Red 53:1, Pigment Red 57:1, Pigment Red 83:1, Pigment Violet 23, Pigment Green 7 and so on, and combinations thereof.

The colorant, for example carbon black, cyan, magenta and/or yellow colorant, may be incorporated in an amount sufficient to impart the desired color to the toner. In general, pigment or dye, may be employed in an amount ranging from 0% to about 35% by weight of the toner particles on a solids basis, from about 2% to about 25% by weight, from about 5% to about 15% by weight.

Surfactants

In embodiments, toner compositions may be in dispersions including surfactants. Emulsion aggregation (EA) methods where the polymer and other components of the toner are in combination may employ one or more surfactants to form an emulsion.

One, two or more surfactants may be used. The surfactants may be selected from ionic surfactants and nonionic surfactants, or combinations thereof. Anionic surfactants and cationic surfactants are encompassed by the term, "ionic surfactants."

In embodiments, the surfactant or the total amount of surfactants may be used in an amount of from about 0.01% to about 10% by weight of the composition, from about 0.75% to about 7.5% by weight of the composition, from about 1% to about 3% by weight of the composition.

Examples of nonionic surfactants include, for example, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether and dialkylphenoxy poly(ethyleneoxy) ethanol, for example, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants include a block copolymer of polyethylene oxide and polypropylene oxide, including those commercially available as SYNPERONIC® PR/F, in embodiments, SYNPERONIC® PR/F 108; and a DOWFAX, available from The Dow Chemical Corp.

Anionic surfactants include sulfates and sulfonates, such as, sodium dodecylsulfate (SDS), sodium dodecylbenzene sulfonate, sodium dodecylnaphthalene sulfate and so on; dialkyl benzenealkyl sulfates; acids, such as, palmitic acid, and NEOGEN or NEOGEN SC obtained from Daiichi Kogyo Seiyaku, and so on, combinations thereof and the like. Other suitable anionic surfactants include, in embodiments, alkyldiphenyloxide disulfonates or TAYCA POWER BN2060 from Tayca Corporation (Japan), which is a branched sodium dodecyl benzene sulfonate.

Examples of cationic surfactants include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, trimethyl ammonium bromides, halide salts of quaternized polyoxyethylkylamines, dodecylbenzyl triethyl ammonium chlorides, MIRAPOL® and ALKAQUAT® available from Alkaril Chem. Co., SANISOL® (benzalkonium chloride) available from Kao Chemicals and the like, and mixtures thereof.

Waxes

The toners of the instant disclosure, optionally, may contain a wax, which may be either a single type of wax or a mixture of two or more different types of waxes (hereinafter identified as, "a wax".) A wax may be present in an amount from about 1 wt %/o to about 25 wt % of the toner particles, from about 5 wt % to about 20 wt % of the toner particles. Waxes may have an $M_w$ of from about 500 to about 20,000, from about 1,000 to about 10,000.

Waxes that may be used include, for example, polyolefins, such as, polyethylene, polypropylene and polybutene waxes, such as, those that are commercially available, for example, POLYWAX™ polyethylene waxes from Baker Petrolite, wax emulsions available from Michaelman, Inc. or Daniels Products Co., EPOLENE N15™ which is commercially available from Eastman Chemical Products, Inc., VISCOL 550-P™, a low weight average molecular weight polypropylene available from Sanyo Kasei K.K.; plant-based waxes, such as carnauba wax, rice wax, candelilla wax, sumac wax and jojoba oil; animal-based waxes, such as beeswax; mineral-based waxes and petroleum-based waxes, such as montan wax, ozokerite, ceresin wax, paraffin wax, microcrystalline wax and Fischer-Tropsch waxes; ester waxes obtained from higher fatty acids and higher alcohols, such as stearyl stearate and behenyl behenate; ester waxes obtained from higher fatty acids and monovalent or multivalent lower alcohols, such as butyl stearate, propyl oleate, glyceride monostearate, glyceride distearate and pentaerythritol tetrabehenate; ester waxes obtained from higher fatty acids and multivalent alcohol multimers, such as diethyleneglycol monostearate, dipropyleneglycol distearate, diglyceryl distearate and triglyceryl tetrastearate; sorbitan higher fatty acid ester waxes, such as sorbitan monostearate; cholesterol higher fatty acid ester waxes, such as, cholesteryl stearate, and so on. Examples of functionalized waxes that may be used include, for example, amines and amides, for example, AQUA SUPERSLIP 6550™ and SUPERSLIP 6530™ available from Micro Powder Inc.; fluorinated waxes, for example, POLYFLUO 190™, POLYFLUO 200™, POLYSILK 19™ and POLYSILK 14™ available from Micro Powder Inc.; mixed fluorinated amide waxes, for example, MICROSPERSION 19™ also available from Micro Powder Inc.; imides, esters, quaternary amines, carboxylic acids, acrylic polymer emulsions, for example, JONCRYL 74™, 89™, 130™, 537™ and 538™ available from SC Johnson Wax; and chlorinated polypropylenes and polyethylenes available from Allied Chemical, Petrolite Corp. and SC Johnson.

Optional Additives

The toner may include any known charge additives in amounts of from about 0.1 to about 10 weight % of the toner. Examples of such charge additives include alkyl pyridinium halides, bisulfates, the charge control additives of U.S. Pat. Nos. 3,944,493; 4,007,293; 4,079,014; 4,394,430; and 4,560,635, the disclosure of each of which herein is incorporated by reference in entirety, negative charge enhancing additives, such as, aluminum complexes, and the like.

Charge enhancing molecules may be used to impart either a positive or a negative charge on a toner particle. Examples include quaternary ammonium compounds, see, for example, U.S. Pat. No. 4,298,672, organic sulfate and sulfonate compounds, see for example, U.S. Pat. No. 4,338,390, cetyl pyridinium tetrafluoroborates, distearyl dimethyl ammonium methyl sulfate, aluminum salts and so on.

Toner Particle Preparation

The toner particles may be prepared by any method within the purview of one skilled in the art, for example, any of the EA methods may be used with a bio-based polyester resin, or chemical processes, such as, suspension and encapsulation processes disclosed, for example, in U.S. Pat. Nos. 5,290,654 and 5,302,486, the disclosure of each of which herein is incorporated by reference in entirety; by conventional granulation methods, such as, jet milling; pelletizing slabs of material, other mechanical processes; any process for producing nanoparticles or microparticles; and so on.

In embodiments relating to an EA process, a resin may be dissolved in a solvent, and may be mixed into an emulsion medium, for example, water, such as, deionized water, optionally containing a stabilizer, and optionally a surfactant. Examples of suitable stabilizers include water-soluble alkali metal hydroxides; ammonium hydroxide; alkali metal carbonates; or mixtures thereof. When a stabilizer is used, the stabilizer may be present in an amount of from about 0.1% to about 5% by weight of the resin.

A bio-based polyester resin may be present, for example, in an amount of from about 5 to about 50 wt % of the toner components, from about 10 to about 35 wt % of the toner components. A bio-based polyester resin may have an $M_n$, as measured by GPC of, for example, from about 1,000 to about 50,000, from about 2,000 to about 25.000, and an $M_w$ of from about 2,000 to about 100,000, from about 3,000 to about 14,000, as determined by GPC. The $M_w/M_n$ of the bio-based polyester resin may be from about 2 to about 9, from about 1.5 to about 4. A bio-based polyester resin may have a glass transition temperature ($T_g$) of from about 50° C. to about 60° C. from about 53° C. to about 59° C. A bio-based polyester resin may have a softening point ($T_s$) of from about 110° C. to about 125° C., from about 115° C. to about 120° C. Different softening points may produce toners exhibiting different gloss levels. A bio-based polyester resin may have an acid value from about 2 to about 30 mg KOH/g, from about 9 to about 16 mg KOH/g.

In embodiments relating to an EA process. Following emulsification, toner compositions may be prepared by aggregating a mixture of a resin, a colorant, an optional wax and any other desired additives in an emulsion, optionally, with surfactants as described above, and then optionally coalescing the aggregated mixture. The pH of the resulting mixture may be adjusted with an acid, such as, for example, acetic acid, nitric acid or the like to a pH of from about 2 to about 4.5.

Additionally, in embodiments, the mixture may be homogenized. If the mixture is homogenized, mixing may be at from about 600 to about 4,000 rpm. Homogenization may be by any suitable means, including, for example, using an IKA ULTRA TURRAX T50 probe homogenizer.

Aggregation

Following preparation of the above mixture, often, it is desirable to form larger particles or aggregates, often sized in micrometers, from the smaller particles of the initial polymerization reaction, often sized in nanometers. An aggregating factor may be added to the mixture. Suitable aggregating factors include, for example, aqueous solutions of a divalent cation, a multivalent cation or a compound comprising same.

The aggregating factor may be, for example, a polyaluminum halide, such as, polyaluminum chloride (PAC) or the corresponding bromide, fluoride or iodide; a polyaluminum silicate, such as, polyaluminum sulfosilicate (PASS); or a water soluble metal salt, including, aluminum chloride, aluminum nitrite, aluminum sulfate, potassium aluminum sulfate, calcium acetate, calcium chloride, calcium nitrite, calcium oxalate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate or combinations thereof.

In embodiments, the aggregating factor may be added to the mixture at a temperature that is below the $T_g$ of a(the) resin(s).

The aggregating factor may be added to the mixture in an amount of, for example, from about 0.1 part per hundred (pph) to about 1 pph, from about 0.25 pph to about 0.75 pph of the reaction mixture.

To control aggregation of the particles, the aggregating factor may be metered into the mixture over time. For example, the factor may be added incrementally into the mixture over a period of from about 5 to about 240 minutes.

Addition of the aggregating factor also may be done while the mixture is maintained under stirred conditions, in embodiments, from about 50 rpm to about 1,000 rpm; and at a temperature that is below the $T_g$ of the resin or polymer, in embodiments, from about 30° C. to about 90° C. The growth and shaping of the particles following addition of the aggregation factor may be accomplished under any suitable condition(s).

The particles may be permitted to aggregate until a predetermined desired particle size is obtained. Particle size may be monitored during the growth process, for example, with a COULTER COUNTER, for average particle size. The aggregation thus may proceed by maintaining the mixture, for example, at elevated temperature, or slowly raising the temperature, for example, from about 40° C. to about 100° C., and holding the mixture at that temperature for from about 0.5 hours to about 6 hours, while maintaining stirring, to provide the desired aggregated particles. Once the predetermined desired particle size is attained, the growth process is halted.

The characteristics of the toner particles may be determined by any suitable technique and apparatus. Volume average particle diameter and geometric standard deviation (GSD) may be measured using an instrument, such as, a BECKMAN COULTER MULTISIZER 3, operated in accordance with the instructions of the manufacturer.

In embodiments, after aggregation, but prior to coalescence, a resin coating may be applied to the aggregated particles to form a shell thereover. Any resin described herein or as known in the art may be used as the shell. In embodiments, a bioresin as described herein may be included in the shell.

A shell resin may be applied to the aggregated particles by any method within the purview of those skilled in the art. In embodiments, the resin(s) used to form the shell may be in an emulsion, optionally including any surfactant described herein. The emulsion possessing the resin(s) may be combined with the aggregated particles so that the shell forms over the aggregated particles.

Formation of the shell over the aggregated particles may occur while heating to a temperature from about 30° C. to about 80° C. Formation of the shell may take place for a period of time from about 5 minutes to about 10 hours.

The shell may be present in an amount from about 1% to about 80% by weight, from about 20% to about 35% by weight of the toner.

Once the desired final size of the toner particles or aggregates is achieved, the pH of the mixture may be adjusted with base to a value of from about 6 to about 10. Adjustment of pH may be used to freeze, that is, to stop, toner particle growth. The base used to stop toner particle growth may be, for example, an alkali metal hydroxide, such as, for example, sodium hydroxide, potassium hydroxide, ammonium hydroxide, combinations thereof and the like.

In embodiments, an agent may be introduced after aggregation is complete to assist in freezing aggregation. The agent may comprise an organic complexing component, such as, ethylenediaminetetraacetic acid (EDTA), gluconal, hydroxyl-2,2'iminodisuccinic acid (HIDS), dicarboxylmethyl glutamic acid (GLDA), methyl glycidyl diacetic acid (MGDA), hydroxydiethyliminodiacetic acid (HIDA), sodium gluconate, potassium citrate, sodium citrate, nitrotriacetate salt, humic acid, fulvic acid; salts of EDTA, such as, alkali metal salts of EDTA, tartaric acid, gluconic acid, oxalic acid, polyacrylates, sugar acrylates, citric acid, polyaspartic acid, diethylenetriamine pentaacetate, 3-hydroxy-4-pyridinone, dopamine, *eucalyptus*, iminodisuccinic acid, ethylenediaminedisuccinate, polysaccharide, sodium ethylenedinitrilotetraacetate, thiamine pyrophosphate, farnesyl pyrophosphate, 2-aminoethylpyrophosphate, hydroxyl ethylidene-1,1-diphosphinic acid, aminotrimethylenephosphinic acid, diethylene triaminepentamethylene phosphinic acid, ethylenediamine tetramethylene phosphinic acid and mixtures thereof.

Coalescence

Following aggregation to a desired particle size and application of any optional shell, the particles then may be coalesced to a desired final shape, such as, a circular shape, for example, to correct for irregularities in shape and size, the coalescence being achieved by, for example, heating the mixture to a temperature from about 45° C. to about 100° C., which may be at or above the $T_g$ of the resin(s) used to form the toner particles, and/or reducing the stirring, for example, from about 1000 rpm to about 110 rpm. Coalescence may be conducted over a period from about 0.01 to about 9 hours, see, for example, U.S. Pat. No. 7,736,831.

After aggregation and/or coalescence, the mixture may be cooled to room temperature (RT), such as, from about 20° C. to about 25° C. The cooling may be rapid or slow, as desired. A suitable cooling method may include introducing cold water to a jacket around the reactor. After cooling, the toner particles optionally may be washed with water and then dried. Drying may be by any suitable method, including, for example, freeze-drying.

Surface Modifications

Surface additives may be added to the toner compositions of the present disclosure, for example, after washing or drying Examples of such surface additives include, for example, one or more of a metal salt, a metal salt of a fatty acid, a colloidal silica, a metal oxide, such as, $TiO_2$ (for example, for improved relative humidity (RH) stability, tribo control and improved development and transfer stability), an aluminum oxide, a cerium oxide, a strontium titanate, $SiO_2$, mixtures thereof and the like. Examples of such additives include those disclosed in U.S. Pat. Nos. 3,590,000; 3,720,617; 3,655,374; and 3,983,045, the disclosure of each of which herein is incorporated by reference in entirety. Surface additives may be used in an amount of from about 0.1 to about 10 wt % of the toner.

Other surface additives include lubricants, such as, a metal salt of a fatty acid (e.g., zinc or calcium stearate) or long chain alcohols, such as, UNILIN 700 available from Baker Petrolite and AEROSIL R972® available from Degussa. The coated silicas of U.S. Pat. Nos. 6,190,815 and 6,004,714, the disclosure of each of which herein is incorporated by reference in entirety, also may be present. The additive may be present in an amount of from about 0.05 to about 5%, and in embodiments, of from about 0.1 to about 2% of the toner, which additives may be added during the aggregation or blended into the formed toner product.

Silica, for example, may enhance toner flow, tribo control, admix control, improved development and transfer stability and higher toner blocking temperature. Zinc, calcium or magnesium stearate also may provide developer conductivity, tribo enhancement, higher toner charge and charge stability. The external surface additives may be used with or without a coating or shell.

Each of the external additives may be present in embodiments in amounts of from about 0.1 to about 5 wt % of the toner. Several of the aforementioned additives are illustrated in U.S. Pat. Nos. 3,590,000, 3,800,588, and 6,214,507, the disclosure of each of which is incorporated herein by reference.

The dry toner particles, exclusive of external surface additives, may have the following characteristics: (1) volume average diameter (also referred to as, "volume average particle diameter,") of from about 2.5 to about 20 μm; (2) number average geometric standard deviation ($GSD_n$) and/or volume average geometric standard deviation ($GSD_v$) of from about 1.18 to about 1.30; and (3) circularity of from about 0.9 to about 1.0 (measured with, for example, a Sysmex FPIA 2100 analyzer.)

The gloss of a toner may be influenced by the amount of retained metal ion, such as, $Al^{3+}$, in a particle. The amount of retained metal ion may be adjusted further by the addition of an agent, such as, EDTA. In embodiments, the amount of retained catalyst, for example, $Al^{3+}$, in toner particles of the present disclosure may be from about 0.1 pph to about 1 pph, from about 0.25 pph to about 0.8 pph. The gloss level of a toner of the instant disclosure may have a gloss, as measured by Gardner gloss units (gu), of from about 20 gu to about 100 gu.

Developers

The toner particles thus formed may be formulated into a developer composition. For example, the toner particles may be mixed with carrier particles to achieve a two-component developer composition. The toner concentration in the developer may be from about 1% to about 25% by weight of the total weight of the developer, with the remainder of the developer composition being the carrier.

Carrier

Examples of carrier particles for mixing with the toner particles include those particles that are capable of triboelectrically obtaining a charge of polarity opposite to that of the toner particles. Illustrative examples of suitable carrier particles include granular zircon, granular silicon, glass, steel, nickel, ferrites, iron ferrites, silicon dioxide, one or more polymers and the like. Other carriers include those disclosed in U.S. Pat. Nos. 3,847,604; 4,937,166; and 4,935,326.

In embodiments, the carrier particles may include a core with a coating thereover, which may be formed from a polymer or a mixture of polymers that are not in close proximity thereto in the triboelectric series, such as, those as taught herein or as known in the art. The coating may include fluoropolymers, such as polyvinylidene fluorides, terpolymers of styrene, methyl methacrylates, silanes, such as triethoxy silanes, tetrafluoroethylenes, other known coatings and the like. For example, coatings containing polyvinylidenefluoride, available, for example, as KYNAR 301F™, and/or polymethylmethacrylate (PMMA), for example, having a weight average molecular weight of about 300,000 to about 350,000, such as, commercially available from Soken, may be used. The coating may have a weight of from about 0.1 to about 10%, from about 0.5 to about 5% by weight of the carrier.

Various effective suitable means may be used to apply the polymer to the surface of the carrier core, for example, cascade roll mixing, tumbling, milling, shaking, electrostatic powder cloud spraying, fluidized bed mixing, electrostatic disc processing, electrostatic curtain processing, combinations thereof and the like. The mixture of carrier core particles and polymer then may be heated to enable the polymer to melt and to fuse to the carrier core. The coated carrier particles then may be cooled and classified to a desired size.

In embodiments, suitable carriers may include a steel core, for example, of from about 25 to about 100 μm in size, coated with about 0.5% to about 10% by weight of a polymer mixture including, for example, methylacrylate and carbon black, using the process described, for example, in U.S. Pat. Nos. 5,236,629 and 5,330,874.

Devices Comprising a Toner Particle

Toners and developers may be combined with a number of devices ranging from enclosures or vessels, such as, a vial, a bottle, a flexible container, such as a bag or a package, and so on, to devices that serve more than a storage function.

The toner compositions and developers of interest may be incorporated into devices dedicated, for example, to delivering same for a purpose, such as, forming an image. Hence, particularized toner delivery devices are known, see, for example, U.S. Pat. No. 7,822,370, and may contain a toner preparation or developer of interest. Such devices include cartridges, tanks, reservoirs and the like, and may be replaceable, disposable or reusable.

A toner or developer of interest may be included in a device dedicated to delivery thereof, for example, for recharging or refilling toner or developer in an imaging device component, such as, a cartridge, in need of toner or developer, see, for example, U.S. Pat. No. 7,817,944, wherein the imaging device component may be replaceable or reusable.

Imaging Devices

The toners or developers may be used for electrostatographic or electrophotographic processes, including those disclosed in U.S. Pat. No. 4,295,990, the disclosure of which herein is incorporated by reference in entirety. In embodiments, any known type of image development system may be used in an image developing device, including, for example, magnetic brush development, jumping single component development, hybrid scavengeless development (HSD) and the like. Those and similar development systems are within the purview of those skilled in the art.

The following Examples illustrate embodiments of the instant disclosure. The Examples are intended to be illustrative only and are not intended to limit the scope of the present disclosure. Parts and percentages are by weight unless otherwise indicated.

EXAMPLES

Preparation of Polyester Resin

To a 2-L Buchi reactor (or 5 gallon reactor) were added rosin acid and bis-epoxy monomer. The mixture was heated to 170° C. and maintained until the acid value was less than 1 mg/g KOH. To that mixture then were added 1,2-propylene glycol, terephthalic acid (TPA), succinic acid; and TC-400 (Matsumoto), phosphinic acid (<0.01 wt %) or a combination of TC-400 and phosphinic acid. The mixture then was heated from 165° C. to 220° C. over up to a 30 hour period under vacuum.

The product then was discharged from the reactor and cooled to RT. $T_s$, was measured with a Mettler FP90, $T_g$ with a Dupont 910 Differential Scanning Calorimeter, the AV was measured manually using phenolphthalein as the indicator and 1N potassium methoxide as the titrant, and the Gardner Color Index value was measured using a Lovibond Tintometer PFX190.

Results of use of the various catalysts may be seen in Table 1.

TABLE 1

Polyester Resin Characteristics Using Various Catalysts.

| Resin | Catalyst | Acid value | $T_s$ | $T_g$ | Time (hrs) | Color | Gardner Index |
|---|---|---|---|---|---|---|---|
| Control | Sn | 10-14 | 124 | 56 | 20 | Yellow | 15 |
| Exp 1 | TC-400 | 11.8 | 130.7 | 61 | 20 | Yellow | 12 |
| Exp 2 | Phosphinic Acid | 43 | 114 | 56 | 30 | Colorless | 1 |
| Exp 3 | Phosphinic Acid | 16.9 | 124.6 | 59.8 | 30 | Colorless | 1 |
| Exp 4 | TC-400/Phosphinic (3:1) | 14.8 | 119.7 | 59.3 | 23 | Colorless | 2 |
| Exp 5) | TC-400/Phosphinic (4:1) | 12.9 | 122 | 59.8 | 22 | Colorless | 1 |

The data indicate that using TC-400 (Exp 1), the resin color is yellow (with a Gardner Color Index value of 12) and has poor clarity (undissolved TPA monomer). Using only phosphinic acid, Exps 2 and 3, at low concentration (0.01 wt %), the resin obtained was colorless (Gardner Color Index value of 1) and clear, but requires over 30 hours of process time. Using a combination of TC-400 and phosphinic acid, Exp 4 (2 liter reactor) and Exp 5 (5 gal reactor), both colorless (Gardner Color Index of 1 or 2) and clear resin was obtained in about 22-23 hours process time. All other properties, e.g., AV, $T_s$ and $T_g$ specifications, were maintained.

It will be appreciated that various of the above-disclosed and other features and functions, or alternatives thereof, may be desirably combined into many other different systems or applications. Also various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color or material.

All references cited herein are herein incorporated by reference in entirety.

We claim:

1. A colorless polyester resin (cPR) consisting of a polyacid, and a polyol wherein said colorless polyester is generated from the reaction of a rosin acid and a bis-epoxy monomer to form a rosin diol and subsequently reacting said rosin diol with a polyacid and a polyol, and optionally, a multifunctional branching agent, wherein said reacting is accomplished in the presence of a phosphinic acid catalyst selected in an amount no more than about 0.04 weight percent, no more than about 0.03 weight percent, no more than about 0.02 weight percent, no more than about 0.01 weight percent, no more than about 0.008 weight percent, or no more than about 0.005 weight percent of the total reactants and a titanium-based catalyst, and wherein the ratio in parts by weight of the titanium-based catalyst to the phosphinic acid catalyst is from about 2:1 to about 5:1, from about 2.5:1 to about 4.5:1, or from about 3:1 to about 4:1.

2. The cPR of claim 1, wherein the phosphinic acid catalyst amount is from about 0.01 to about 0.02 weight percent.

3. The cPR of claim 2, wherein the titanium catalyst is selected from the group consisting of tetra-n-butyl titanate, tetra(2-ethylhexyl) titanate, tetramethyl titanate, polyhydroxytitanium stearate, titanium tetraacetyl acetate, titanium octylene glycolate, titanium ethyl acetoacetate, titanium lactate, titanium triethanol aminate, titanium alkoxide, titanium acylate, titanium chelate and tetraisopropyl titanate and wherein said titanium catalyst to said phosphinic acid ratio is from about 2:1 to about 5:1.

4. The cPR of claim 1, wherein said polyol is selected from the group consisting of abietic-diol, abietic-monoglycerate, palustric-diol, palustric-monoglycerate, dehydroabietic-diol, dehydroabietic-monoglycerate, neo-abietic-diol, neo-abietic-monoglycerate, levo-pimaric-diol, levo-pimaric-monoglycerate, pimaric-diol, pimaric-monoglycerate, sandaracopimaric-diol, sandaracopimaric-monoglycerate, iso-pimaric-diol, iso-pimaric-monoglycerate, hydrogenated abietic-diol, hydrogenated palustric-diol, hydrogenated dehydroabietic-diol, hydrogenated neo-abietic-diol, hydrogenated levo-pimaric-diol, hydrogenated pimaric-diol, hydrogenated sandaracopimaric-diol and hydrogenated iso-pimaric-diol.

5. The cPR of claim 1, wherein said cPR has a Gardner Color Scale value of no greater than 5, no greater than 4, no greater than 3, or no greater than 2.

6. The cPR of claim 1, wherein said polyacid is selected from the group consisting of terephthalic acid, phthalic acid, isophthalic acid, fumaric acid, trimellitic acid, diethyl fumarate, dimethyl itaconate, cis-1,4-diacetoxy-2-butene, dimethyl fumarate, diethyl maleate, maleic acid, succinic acid, itaconic acid, succinic acid, cyclohexanoic acid, succinic anhydride, dodecylsuccinic acid, dodecylsuccinic anhydride, glutaric acid, glutaric anhydride, adipic acid, pimelic acid, suberic acid, azelaic acid, dodecanedioic acid, dimethyl naphthalenedicarboxylate, dimethyl terephthalate, diethyl terephthalate, dimethylisophthalate, diethylisophthalate, dimethylphthalate, phthalic anhydride, diethylphthalate, dimethylsuccinate, naphthalene dicarboxylic acid, dimer diacid, dimethylfumarate, dimethylmaleate, dimethylglutarate, dimethyladipate, dimethyl dodecylsuccinate and combinations thereof.

7. The cPR of claim 1, wherein said polyol is selected from the group consisting of ethylene glycol, propylene glycol, butylene glycol and pentylene glycol.

8. The cPR of claim 1, wherein said phosphinic acid catalyst is present in an amount of from about 0.01 to 0.02 weight percent and the ratio of the titanium catalyst to the phosphinic acid catalyst is from about 2:1 to about 5:1.

9. The cPR of claim 1 wherein said cPR has a Gardner Color Scale value of from 1 to 2.

10. A bio-based colorless polyester resin (cPR) composition consisting of at least one polyacid, and a polyol, wherein said colorless polyester is generated from the reaction of a rosin acid and a bis-epoxy monomer to form a rosin diol and subsequently reacting said rosin diol with at least one polyacid and a polyol, wherein said reacting is accomplished in the presence of a phosphinic acid catalyst selected in an amount of from about 0.005 weight percent to about 0.02 weight percent of the total reactants and a titanium catalyst, wherein the ratio in parts by weight of the titanium-based catalyst to the phosphinic acid catalyst is from about 2:1 to about 5:1 and wherein said cPR has a Gardner Color Scale value of from about 1 to about 5.

11. The composition of claim 10, wherein the phosphinic acid catalyst amount is from about 0.01 to 0.02 weight percent, the ratio of the titanium catalyst to the phosphinic acid catalyst is from about 2.5:1 to about 4.5:1 and said cPR has a Gardner Color Scale value of from about 1 to about 2.

12. The composition of claim 10, wherein said titanium catalyst is selected from the group consisting of tetra-n-butyl titanate, tetra(2-ethylhexyl) titanate, tetramethyl titanate, polyhydroxytitanium stearate, titanium tetraacetyl acetate, titanium octylene glycolate, titanium ethyl acetoacetate, titanium lactate, titanium triethanol aminate, titanium alkoxide, titanium acylate, titanium chelate and tetraisopropyl titanate and wherein at least one polyacid is two of a terephthalic acid and a succinic acid.

13. The composition of claim 10, wherein said polyol is selected from the group consisting of abietic-diol, abietic-monoglycerate, palustric-diol, palustric-monoglycerate, dehydroabietic-diol, dehydroabietic-monoglycerate, neo-abietic-diol, neo-abietic-monoglycerate, levo-pimaric-diol, levo-pimaric-monoglycerate, pimaric-diol, pimaric-monoglycerate, sandaracopimaric-diol, sandaracopimaric-monoglycerate, iso-pimaric-diol, iso-pimaric-monoglycerate, hydrogenated abietic-diol, hydrogenated palustric-diol, hydrogenated dehydroabietic-diol, hydrogenated neo-abietic-diol, hydrogenated levo-pimaric-diol, hydrogenated pimaric-diol, hydrogenated sandaracopimaric-diol and hydrogenated iso-pimaric-diol.

14. The composition of claim 13, wherein said polyester produced has a Gardner Color Scale value of no more than 5.

15. The composition of claim 10, wherein said polyacid is selected from the group consisting of terephthalic acid, phthalic acid, isophthalic acid, fumaric acid, trimellitic acid, diethyl fumarate, dimethyl itaconate, cis-1,4-diacetoxy-2-butene, dimethyl fumarate, diethyl maleate, maleic acid, succinic acid, itaconic acid, succinic acid, cyclohexanoic acid, succinic anhydride, dodecylsuccinic acid, dodecylsuccinic anhydride, glutaric acid, glutaric anhydride, adipic acid, pimelic acid, suberic acid, azelaic acid, dodecanedioic acid, dimethyl naphthalenedicarboxylate, dimethyl terephthalate, diethyl terephthalate, dimethylisophthalate, diethylisophthalate, dimethylphthalate, phthalic anhydride, diethylphthalate, dimethylsuccinate, naphthalene dicarboxylic acid, dimer diacid, dimethylfumarate, dimethylmaleate, dimethylglutarate, dimethyladipate, dimethyl dodecylsuccinate and combinations thereof.

16. The composition of claim 10, wherein said polyol is selected from the group consisting of ethylene glycol, propylene glycol, butylene glycol and pentylene glycol.

17. The composition of claim 16 wherein said phosphinic acid is present in an amount of about 0.01 weight percent.

18. The composition of claim 12, wherein said titanium catalyst to phosphinic acid ratio is between about 2:1 to about 5:1.

19. A process for the preparation of a toner composition consisting of mixing a colorant and a colorless polyester resin, wherein said colorless polyester is generated from the reaction of a rosin acid and a bis-epoxy monomer to form a rosin diol and subsequently reacting said rosin diol with a polyacid and a polyol, and optionally, a multifunctional branching agent, wherein said reacting is accomplished in the presence of a phosphinic acid catalyst selected in an amount no more than about 0.04 weight percent, no more than about 0.03 weight percent, no more than about 0.02 weight percent, no more than about 0.01 weight percent, no more than about 0.008 weight percent, or no more than about 0.005 weight percent of the total reactants, and a titanium catalyst, and wherein the ratio in parts by weight of the titanium catalyst to the phosphinic acid is from about 2:1 to about 5:1, from about 2.5:1 to about 4.5:1, or from about 3:1 to about 4:1.

20. A process in accordance with claim 19 wherein said toner composition is prepared by emulsion/aggregation methods.

* * * * *